United States Patent
Champlin et al.

(10) Patent No.: US 12,499,145 B1
(45) Date of Patent: Dec. 16, 2025

(54) MULTI-AGENT FRAMEWORK FOR NATURAL LANGUAGE PROCESSING

(71) Applicant: THE BANK OF NEW YORK MELLON, New York, NY (US)

(72) Inventors: Matthew Champlin, Matawan, NJ (US); Chaz Anthony Darvish, Mcknight, PA (US); Richard Joseph Comeau, Westborough, MA (US); Deeya Patel, Ossining, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 0 days.

(21) Appl. No.: 18/988,253

(22) Filed: Dec. 19, 2024

(51) Int. Cl.
*G06F 16/00* (2019.01)
*G06F 16/334* (2025.01)
*G06F 16/338* (2019.01)
*G06F 16/34* (2019.01)

(52) U.S. Cl.
CPC ........ *G06F 16/345* (2019.01); *G06F 16/3344* (2019.01); *G06F 16/338* (2019.01)

(58) Field of Classification Search
CPC .................................................. G06F 16/3344
See application file for complete search history.

(56) References Cited

U.S. PATENT DOCUMENTS

| | | | |
|---|---|---|---|
| 11,093,841 B2 | 8/2021 | Baughman et al. | |
| 11,562,144 B2 | 1/2023 | Song et al. | |
| 11,921,764 B2 | 3/2024 | Prasad Tanniru et al. | |
| 12,111,859 B2 | 10/2024 | Siebel et al. | |
| 2001/0053968 A1 | 12/2001 | Galitsky et al. | |
| 2011/0307435 A1 | 12/2011 | Overell et al. | |
| 2019/0179940 A1 | 6/2019 | Ross et al. | |
| 2020/0210647 A1 | 7/2020 | Panuganty et al. | |
| 2022/0036153 A1 | 2/2022 | O'Malia et al. | |
| 2022/0391592 A1* | 12/2022 | Klein | G06F 16/953 |
| 2023/0131495 A1 | 4/2023 | Tater et al. | |
| 2023/0135179 A1 | 5/2023 | Mielke et al. | |

OTHER PUBLICATIONS

"Introduction-CrewAI, Build AI agent teams that work together to tackle complex tasks", downloaded Dec. 19, 2024, 4 pgs. https://docs.crewai.com/introduction.

* cited by examiner

*Primary Examiner* — Ajith Jacob
(74) *Attorney, Agent, or Firm* — Pillsbury Winthrop Shaw Pittman, LLP (57) ABSTRACT

The disclosure relates to a multi-agent framework that includes a plurality of language model (LM) agents that each perform a respective Natural Language Processing (NLP) task to analyze content having natural language text. An LM agent may execute a language model to perform its respective NLP task. For example, to identify target information within content, a first LM agent in the multi-agent framework may generate a summary of the content along with the target information, a second LM agent may extract, independently from the first LM agent, the target information and output reasoning that explains why the target information was extracted, and a third LM agent may verify that the target information was correctly identified based on the output of the first and second LM agents.

20 Claims, 5 Drawing Sheets

MULTI-AGENT FRAMEWORK FOR NATURAL LANGUAGE PROCESSING

BACKGROUND

Natural language text is typically unstructured without a discernible or repeating pattern which can make it challenging for computers to understand content having natural language text. Natural Language Processing (NLP) techniques are often limited to scenarios where data follows a structured or predictable format. However, these techniques struggle when applied to unstructured documents, where the lack of consistency and context can hinder accurate data extraction. For example, a common deficiency in NLP is the inability to handle the complexity, variability, and context-dependent nature of unstructured data. NLP analysis often requires significant manual effort, can be susceptible to unanticipated data formats, and may be unable to fully understand the broader context of the natural language text being analyzed. This results in incomplete or inaccurate data extraction, particularly when dealing with nuanced information that is not explicitly structured or categorized.

SUMMARY

The disclosure relates to a multi-agent framework that includes a plurality of language model (LM) agents that are each configured with distinct roles to collaborate in identifying target information from unstructured text. The multi-agent framework facilitates an adaptive and context-aware extraction process that significantly improves extraction accuracy.

For example, the multi-agent framework may include a summarizer agent, an assessor agent, and a verifier agent. The summarizer agent may ingest the entire content having unstructured text and distill the content into a summary. The summarizer agent may be uniquely configured to prioritize the extraction of specific target information in the content. The summarizer agent may identify and highlight information that may be relevant to the target information in the content. The specific target information that is extracted may vary depending on the context in which the multi-agent framework is implemented.

The assessor agent may directly interact with the entire content, making a first best-effort attempt at extracting the target information of interest, even amidst the noise of the full context of the content. The assessor agent is configured to directly engage with the complete context, leveraging all available information to identify the most relevant data point for the target information. The assessor agent may identify and extract the data point most relevant to an input query, such as a request from a user to identify and extract target information from content having unstructured text. The output of the assessor agent may include the target information and the reasoning behind its selection. The reasoning provides a detailed explanation of why the assessor agent identified this particular data point as the target information being requested.

The outputs of the summarizer agent and the assessor agent may be provided to a verifier agent in the multi-agent framework. The verifier agent is also provided with the objective of the data extraction task. The verifier agent may examine the outputs of the summarizer agent and the assessor agent, ensuring that the data point extracted by the accessor agent is correct. By leveraging the summary and reasoning provided, the verifier agent may avoid redundancy and instead focuses on contextual validation. In some examples, the verifier agent may modify the final result of the accessor agent if the verifier agent determines that the extracted target information is incorrect. This may occur if the verifier agent determines that the extracted target information is not actually the intended data to be extracted. This verification may minimize potential hallucinations (erroneous outputs) from summarizer agent and/or the assessor agent, resulting in improved accuracy.

BRIEF DESCRIPTION OF THE DRAWINGS

Features of the present disclosure may be illustrated by way of example and not limited in the following figure(s), in which like numerals indicate like elements, in which.

DETAILED DESCRIPTION

Figure 1:
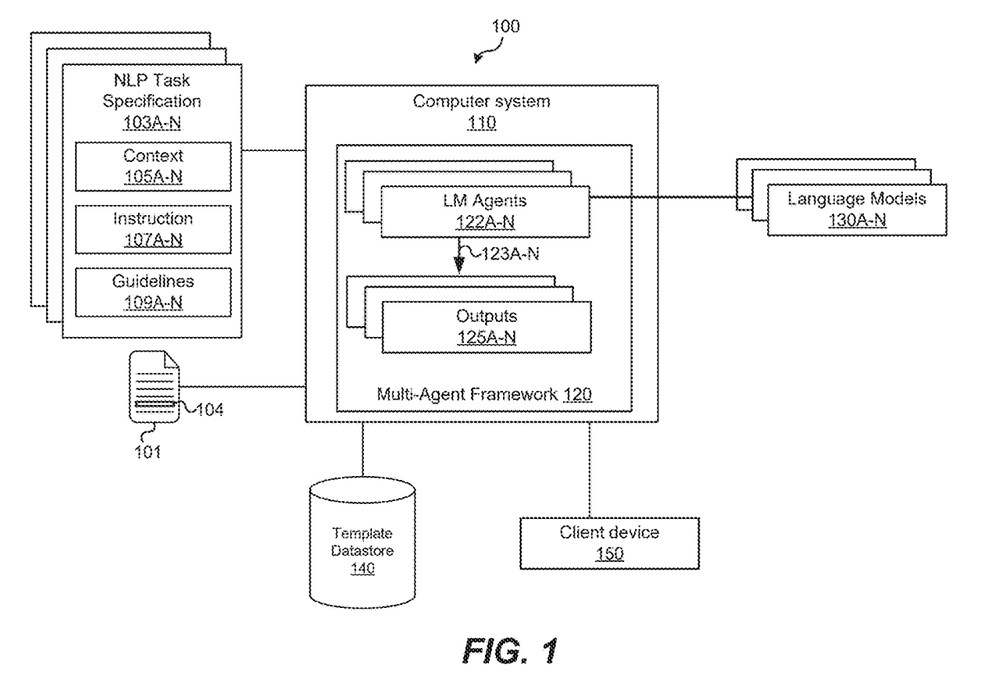
FIG. 1 illustrates an example of a system for a multi-agent framework for NLP tasks, according to an implementation.

FIG. 1 illustrates an example of a system 100 for a multi-agent framework for executing NLP tasks to complete an NLP task, according to an implementation. An NLP task is a computer function that analyzes human language to achieve an end result based on an understanding of words or phrases. NLP tasks can include text classification, sentiment analysis, entity recognition, and/or other computational analysis of human language. One example of an NLP task is to identify and extract target information 104 from content 101 that includes natural language text. Identifying and extracting target information may involve classifying text. In particular, identifying certain dates in the content may involve categorizing text that relates to dates and identifying dates that are of interest. Because the context may include unstructured text with high variability, performing NLP tasks, including extracting target information from content, may be prone to computational error.

The system 100 may include a computer system 110, a client device 150, and/or other components. Each of these components of system 100 may include one or more processors programmed with the features described herein. The computer system 110 may implement and execute a multi-agent framework 120 having a plurality of language model (LM) agents 122 (illustrated as LM agents 122A-N) to perform an NLP task on content 101. The content 101 is data that includes at least some words or phrases, which may include natural language text. In some examples, the content 101 is unstructured. That is, the content 101 may not have expressly categorized data. The content 101 may have target information 104 that is to be extracted. That is, the computer system 110 may execute the plurality of LM agents 122, which each perform respective NLP tasks 123A-N, to extract the target information 104 from the content 101.

An LM agent 122 is a software and/or hardware system that is configured to execute one or more language models (LM) 130 (illustrated as language models 130A-N) to analyze text in content 101. An LM agent 122 may perform a respective NLP task 123. For example, an LM agent 122A may perform a NLP task 123A, an LM agent 122B may perform a NLP task 123B, and so forth. A language model 130 is a generative Artificial Intelligence (AI) model for language. In particular, the language model 130 may be a pretrained deep-learning Large Language Model (LLM) trained on large language datasets. The language model 130 may be trained to semantically understand natural language and automatically generate new text based on this understanding. Examples of the language model 130 may include, without limitation, one or more variants of: OpenAI GPT, LLAMA from META, Google LaMBDA, BERT from GOOGLE, BigScience BLOOM, Multitask Unified Model (MUM), or other language models.

In some examples, each LM agent 122 may be provided with a respective NLP task specification 103 (collectively illustrated as NLP task specification 103A-N). Each NLP task specification 103 may include a respective context 105, a instruction 107, one or more guidelines 109, and/or other information related to NLP task processing. The NLP task specifications may be stored in a template datastore 140 for reuse and/or reconfiguring. The context 105 may provide contextual information about the NLP task to be conducted. The instruction 107 may include one or more descriptions of the task to be conducted. The one or more guidelines 109 may include one or more rules for performing the NLP task. Each NLP task specification 103 will be specifically tailored to define a respective NLP task 123A-N to be performed by a corresponding LM agent 122A-N. For instance, an NLP task specification 103A with its context 105A, instruction 107A, and guidelines 109A may define an NLP task 123A to be performed by an LM agent 122A. In some examples, at least one of the LM agents 123 may verify the outputs 125 of one or more other LM agents 123.

In an example operation, a client device 150 may transmit a request to perform an NLP task on content 101. For example, the request may be to extract target information 104 from the content 101 or database of content. The computer system 110 may execute the plurality of LM agents 122 in the multi-agent framework 120 to extract the target information and verify that the target information is correct. The computer system 110 may return the requested target information back to the client device 150.

Figure 2:
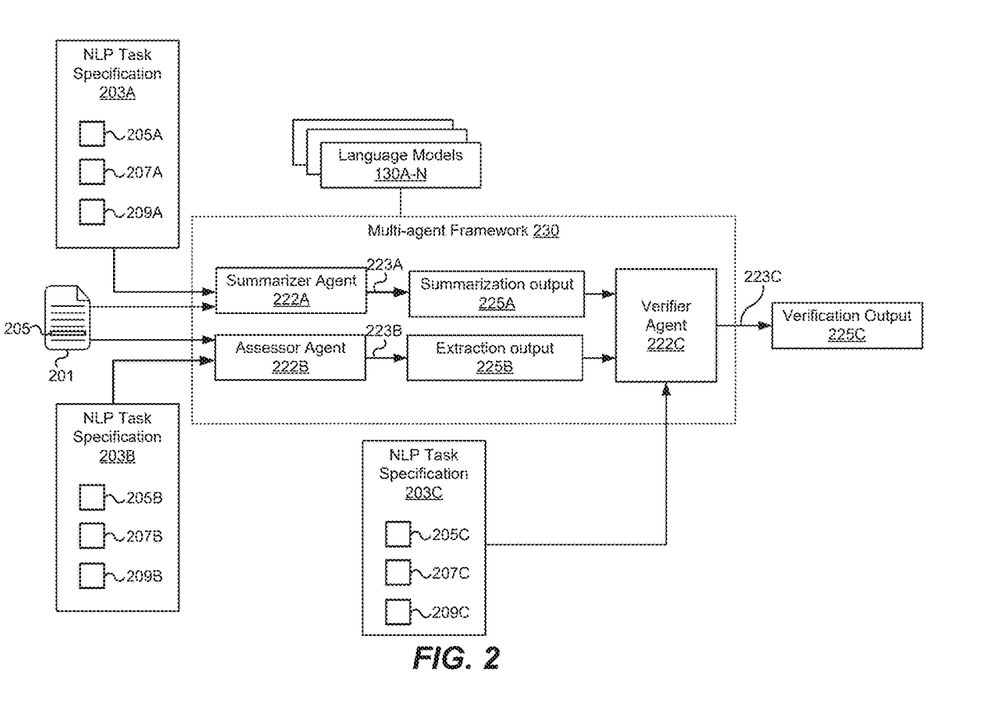
FIG. 2 illustrates an example of a multi-agent framework having at least a summarizer agent, an assessor agent, and a verifier agent, according to an implementation.

FIG. 2 illustrates an example of a multi-agent framework 220 having at least a summarizer agent 222A, an assessor agent 222B, and a verifier agent 222C, according to an implementation. The multi-agent framework 220 is an example of an implementation of the multi-agent framework 120 illustrated in FIG. 1. In the example illustrated in FIG. 2, the content 201 may be a release announcement comprising text that describes an event, such as a product or software release or rollout event. In this example, the multi-agent framework 220 may be configured to perform an NLP task in which target information 205 within the content 201 is identified and extracted. In particular, the target information 205 may be a planned "rollout date" for software, as described in the release announcement. This example is disclosed for illustration and not limitation. The multi-agent frameworks 120 and/or 220 may identify and extract more than one target date (other than just the rollout date) from the content 201.

Alternatively, or additionally, the multi-agent frameworks 120 and/or 220 may be configured to perform other types of NLP tasks based on the disclosures herein. For example, by customizing the NLP task specifications provided to the multi-agent framework, the system may be generalized to extract any type of target data from unstructured text.

Summarization Task

The summarizer agent 222A may receive, as input, the content 201 and an NLP task specification 203A. The NLP task specification 203A is data that defines the NLP summarization task 223A. For example, the NLP task specification 203A may include context information 205A, a task instruction 207A, one or more guidelines 209A, and/or other task information for the NLP summarization task 223A.

The context information 205A may include text that describes the context associated with the NLP summarization task 223A. The summarizer agent 222A may provide the LM 130 with the content 201 in various ways. For example, the summarizer agent 222A may provide the LM 130 with the content 201 within a prompt, such as by extracting data from the content 201 as a string that is input to the LM 130. Alternatively, or additionally, the summarizer agent 222A may provide the LM 130 with the content 201 as a link or other file location (such as a local link or networked Uniform Resource Indicator) of the content to the LM 130. If supported by the LM 130, one or more prompts may be provided via string input and/or file input as well.

In some examples, the context information 205A may include access information that indicates how to access the content 201. For example, the context information 205A may include the following, in which the content 201 is denoted as a "Message":

You will be given a message about a change or update related to a Software Product. The message will follow the string "Message:", and the message itself is enclosed using three hyphens.

The task instruction 207A may include text that describes the NLP summarization task 223A to be completed. In some examples, the task instruction 207A may include one or more parameters for completing the NLP summarization task 223A. For example, the task instruction 207A may set a maximum number of words to include in the summary, a maximum number of sentences to include in the summary, a style of prose to use in the summary, and/or other parameter for completing the NLP summarization task 223A. In some examples, the task instruction 207A may include target data to identify and include in the summary. To illustrate, an example of a task instruction 207A may include the following:

Your task is to summarize this message into a maximum of 3-5 sentences. You should include the most important information from the message, such as the change being made, the product being affected, and the date(s) of the change. Your response should be concise and informative.

The one or more guidelines 209A may include guidelines that are to be adhered to when performing the NLP summarization task 223A and that constrains the summarization output 225A. In some examples, the one or more guidelines 209A may include rules for including certain target data, output format for the summary, and/or other guidelines. To illustrate, an example of one or more guidelines 209A may include the following:

Please include all information about rollout dates and completion dates for any and all release cadences.

Please provide your summary using plain text only. Do not use any escape sequences (such as \n for newline or \t for tab), any formatting (such as bold or italics), or any HTML tags.

Based on these inputs, the summarizer agent 222A may perform an NLP summarization task 223A to generate a summarization output 225A. For example, the summarizer agent 222A may execute one or more language models 130 to generate the summarization output 225A based on the NLP task specification 203A. In some examples, the NLP task specification 203A can be configured as a prompt for input to one or more language models 130, which may be an LLM. In these examples, the summarizer agent 222A may execute the LLM with one or more prompts based on the NLP task specification 203A to generate the summarization output 225A.

The summarization output 225A may include the summary of the content 201. For example, the summarization output 225A may include the output of a language model 130, as executed by the summarizer agent 222A. To illustrate, in an example in which the content 201 is a product support or deprecation announcement, the target information may include a deprecation date for a product ("Product A") that was announced by a software maker ("Company XYZ"). In this example, the summarization output 225 may include the target information extracted from the content 201 along with a summary that provides context for the deprecation date:

Company XYZ will deprecate support for Product A in late 2024. This change aligns with the latest standards. Affected organizations should switch to an alternative product in the next few months, before the deprecation date in October 2024. This information was announced in May 2024.

Extraction Task

The assessor agent 222B may receive, as input, the content 201 and an NLP task specification 203B. The NLP task specification 203B is data that defines the NLP extraction task 223B. For example, the NLP task specification 203B may include context information 205B, a task instruction 207B, one or more guidelines 209B, and/or other task information for the NLP extraction task 223B.

The context information 205B may be similar to the context information 205A. To illustrate, an example of the context information 205B may include:

You will be given a message about a change or update related to a product.
The message will begin with the header "Message:", and the message itself is enclosed using three hyphens, such as:
Message:
---
<MESSAGE>
---

The task instruction 207B may include text that describes the NLP extraction task 223B to be completed. In some examples, the task instruction 207B may include one or more parameters for completing the NLP extraction task 223B and an instruction to provide a reasoning for extracting the target information. For example, the task instruction 207B may include a required output format, one or more rules for extracting target information from the content 201, and/or other parameter for completing the NLP summarization task 223A. Extracting target information refers to identifying target information in the content 201 and including the identified target information in the extraction output 225B. A reasoning may be a rationale, or reason, that the one or more language models 130.

To illustrate, an example of a task instruction 207B may include the following:

Your task is to extract and format ONE date from the message: the "rollout date".
Here are some guidelines to follow to ensure you can perform this task well and accurately:
You must adhere to the following JSON format:
{
　"rollout_date": {
　　"date": "YYYY/MM/DD",
　　"reasoning": "Explanation of why this date was chosen based on the information provided in the message."
　}
}

The one or more guidelines 209B may include guidelines that are to be adhered to when performing the NLP extraction task 223B. In some examples, the one or more guidelines 209B may include one or more rules for extracting the target information. In some examples, the one or more rules may include logic that specifies how to identify the target information.

To illustrate, an example of one or more guidelines 209A may include the following (in which the target information is a date such as a rollout date and/or a completion date):

Here are some rules to follow when extracting the dates:
Use YYYY/MM/DD format (e.g., "2023 Dec. 1" instead of "Dec. 1, 2023").
MOST of the time, you can find the date information under a header that looks like: "When This Will Happen:" that will have multiple categories in it which should be included in the reasoning.
If the ONLY date you can parse from the message is before the 'Last Updated' date, then use the 'Last Updated' date. For example, if the message says "information was added in April 2023.", but this message was last updated on say 2024 May 17, then you would use 2024 May 17, since it doesn't make sense to use a date from the past.
If the message talks about different release cadences or types you should IGNORE the rollout date specified in "Targeted Release" or "Limited Release" "Preview" or "Beta" and pick the EARLIEST date mentioned for the ROLLOUT DATE from the other available categories.
For example, if the message says "Beta: We will begin rolling out early October 2023. General Availability: We will begin rolling out early November 2023 and expect to complete by mid-November 2023. How this will affect your organization:" your response should be:
{
　"rollout_date":
　　{"date": "2023 Nov. 1",
　　"reasoning": "Explanation of why this date was chosen based on the information provided in the message."
　}
}

If a message specifies an exact date for the rollout date, use that exact date. For example, if a message says "On Oct. 24, 2023 we will roll out new terms", then rollout_date should be set to "2023 Oct. 24".
If a message specifies an approximate date (e.g., early December, mid January, late March), choose an appropriate date number given the approximation. For example, if a message says "We will begin rolling out in mid-December 2023", then rollout date should be set to "2023 Dec. 15".

If a message specifies a range of dates use the EARLIEST date for the rollout date. For example, if a message says "We will begin rolling out late November and expect to complete rollout by early January 2024", then rollout_date should be set to "2023 Nov. 30". PROVIDE THE RANGE IN THE EXPLANATION Special Cases:
1. Sometimes the message is purely informational, and/or no dates are mentioned or can be gleaned from the content.
   In these cases, please use the 'Last Updated' date.

Example

. . . beginning of message . . .
We will be retiring the XYZ settings and new version options from Product A in the coming months. We will provide an update when we have a new timeline to share.
. . . rest of message . . .
Last updated Nov. 1, 2024 . . .
. . . end of message . . .
Your response could be something like:
{
  "rollout_date": {
    "date": "2024 Nov. 1",
    "reasoning": "<your reasoning for using the last updated date>"
  }
}

2. When there are multiple release cadences or types under "When This Will Happen" ignore dates under 'Targeted Release', ignore dates under 'Preview', ignore dates under "Limited Release" and ignore dates under Beta UNLESS they are the only categories available. INSTEAD use the EARLIEST available rollout date from the other categories present. For example:
Message:
. . . beginning of message . . .
Preview: rolling out mid-June 2024 and expect to complete by early September 2024
General Availability (Worldwide): rolling out early July 2024
How this will affect your organization:
. . . end message . . .
Explanation of why this date was chosen based on. INCLUDE ALL the different categories and their associated dates and WHY you chose to ignore or not ignore certain categories
Your response could be something like:
{
  "rollout_date": {
    "date": "2024 Jul. 1",
    "reasoning": "In this case, there are multiple categories so IGNORE Preview and choose the EARLIEST rollout date from the rest of the remaining categories. The remaining categories are General Availability (Worldwide) and General Availability (Limited) and the EARLIEST rollout date between the two categories is early July from General Availability (Worldwide)."
  }
}

To summarize:
  Extract the rollout date.
  Use YYYY/MM/DD format for dates
  For end of the month use the LAST day of the month, for the beginning of the month use the FIRST day of the month, and for the middle of the month mid-month the day should be the 15th
  If the changes are on-going or purely informational, use the 'Last Updated' date for rollout
  If there are multiple releases mentioned, IGNORE the dates in 'Targeted Release', IGNORE the dates in 'Preview' and instead USE the EARLIEST rollout date from the other available categories.
  If a message specifies a range of dates use the EARLIEST date for the rollout date. For example, if a message says "We will begin rolling out late November and expect to complete rollout by early January 2024", then rollout_date should be set to "2023 Nov. 30". PROVIDE THE WHOLE RANGE IN THE EXPLANATION
  YOU MUST OUTPUT YOUR RESPONSE IN THE FOLLOWING JSON FORMAT:
{
  "rollout_date": {
    "date": "YYYY/MM/DD",
    "reasoning": "Explanation of why this date was chosen based on the information provided in the message."
  }
}
"""""

Based on these inputs, the assessor agent 222B may perform an NLP extraction task 223B to generate a extraction output 225B. For example, assessor agent 222B may execute one or more language models 130 to generate the extraction output 225B based on the NLP task specification 203B. The one or more language models 130 executed by the assessor agent 222B may be the same as or different than the one or more language models 130 used by the summarizer agent 222A. In some examples, the NLP task specification 203B can be configured as a prompt for input to one or more language models 130, which may be an LLM. In these examples, the assessor agent 222B may execute the LLM with one or more prompts based on the NLP task specification 203B to generate the extraction output 225B. The extraction output 225B may include the target information identified within the content 201. In some examples, the extraction output 225B may include a reasoning that explains why the target information was identified and extracted by the one or more language models 130 executed by the assessor agent 222B.

Verification Task

The verifier agent 222C may receive, as input, an NLP task specification 203C, the summarization output 225A and the extraction output 225B. Based on these inputs, the verifier agent 222C may perform an NLP verification task 223C to generate a verification output 225C.

The NLP task specification 203C is data that defines the NLP verification task 223C. For example, the NLP task specification 203C may include context information 205C, a task instruction 207C, one or more guidelines 209C, and/or other task information for the NLP verification task 223C.

The context information 205C may be different than the context information 205A because the input to the verifier agent 222C may not include the content 201. Rather, the input to the verifier agent 222C may be the outputs of the summarizer agent 222A and assessor agent 222B (respectively, the summarization output 225A and extraction output 225B). In some examples, the context information 205C may explain the summarization output 225A and extraction output 225B. In some examples, the context information 205C may include text that explains that the summarization output 225A and extraction output 225B may include target information and a reasoning that the target information was extracted from the content 201. To illustrate, an example of the context information 205C may include:

> You will be given a summary of a message about a change or update related to a Software Product, along with a date that was chosen for the rollout date of that change or update.
>
> Also included with this will be the reasoning for picking that date. These data points were picked by other AI models.

The task instruction 207C may include text that describes the NLP verification task 223C to be completed. In some examples, the task instruction 207C may include an instruction to identify the target information if the verifier agent 222C determines that the target information identified in the summarization output 225A and/or extraction output 225B is incorrect. In these examples, the task instruction 207C may further include an instruction to identify the target information using the rules provided in the one or more guidelines 209C. In some examples, the task instruction 207C may include a description of the input format used to provide the summarization output 225A and/or extraction output 225B to be processed by the verifier agent 222C. In some of these examples, the task instruction 207C may include examples of data in the input format.

> Your task is to validate that the date chosen by the other models is correct. If you determine it is not correct, CHANGE IT TO THE CORRECT DATE USING THE RULES BELOW.
>
> I will provide you the data in JSON format, under the header Data. This JSON will include fields for the original 'rollout_date' chosen, the reasoning for picking that date, and the summary of the message about the update or change.
>
> It will look similar to this:
> {'rollout_date': {'date': <ORIGINAL_DATE_CHOSEN_FOR_ROLLOUT_OF_CHANGE_OR_UPDATE>, 'reasoning': '<REASONING_FOR_THIS_CHOICE>'},
> 'summary': '<SUMMARY_OF_MESSAGE_USED_TO_PICK_ROLLOUT_DATE>'}

The one or more guidelines 209C may include guidelines that are to be adhered to when performing the NLP verification task 223C. In some examples, the one or more guidelines 209C may include one or more rules for verifying that the target information extracted by the summarizer agent 222A and/or the assessor agent 222B are correct. In some examples, the one or more rules may include logic that specifies how to perform the verification. In some examples, the one or more rules may include logic that specifies how to identify the target information based on the summarization output 225A and/or the extraction output 225B if the verifier agent 222C determines that the target information in the summarization output 225A or extraction output 225B is incorrect. The target information is deemed incorrect when it is determined that an incorrect portion of the content 201 was identified and included in the summarization output 225A and/or the extraction output 225B. For example, if the target information is a certain date, and the incorrect date or a non-date value was extracted and included in the extraction output 225B, then the target information in the extraction output 225B may be deemed to be incorrect.

An example of the one or more guidelines 209C may include:

> Here are some rules to follow when confirming the provided rollout_date. If you find the original date provided violates one of the following rules, please update the rollout_date in your final output JSON using the rules below:
>
> 1. YOU MUST OUTPUT YOUR RESPONSE IN THE FOLLOWING JSON FORMAT:
> {
>   "rollout_date": {
>     "date": "YYYY/MM/DD"
>   }
> }
>
> 2. If the reasoning mentions it used the "Last Updated Date" as it's date, then use the original rollout_date provided to you in the Data. No further analysis is required.
>
> 3. If the summary specifies an exact date for the rollout date, use that exact date. For example, if a summary says "On Oct. 24, 2023 we will roll out new terms", then rollout_date should be set to "2023 Oct. 24".
>
> 4. If the summary specifies an approximate date (e.g., early December, mid January, late March), choose an appropriate date number given the approximation.
>
>   If the date output says "early <month>", use the first day of the month, i.e. "YYYY/MM/01".
>
>   If the date output says "mid <month>", use the 15th, i.e. "YYYY/MM/15".
>
>   If the date output says "late <month>", use the last day of the month, i.e. "YYYY/MM/<last_day_of_month>".
>
>   For example, if a summary says "We will begin rolling out in early-December 2023", then rollout date should be set to "2023 Dec. 1". If it says "mid-December 2023", then rollout date should be set to "2023 Dec. 15" and if it says "late-December 2023", then rollout date should be set to "2023 Dec. 31"
>
> 5. The rollout date you choose must be BEFORE the completion date:
>
>   For example, if a summary or reasoning says something like "We will begin rolling out in late July and expect to complete rollout by early May 2024", or, "The range of rollout is late July to early May 2024.", since July comes after May, we know that this must be late July of the previous year, 2023! So, we would pick 2023 as the year, and since it says late-July we would pick the 31st for the day.
>
> 6. If you are unsure, use the original rollout_date provided.
>
> 7. You must provide a date for the 'date' value in your JSON in "YYYY/MM/DD" format. DO NOT USE A STRING LIKE 'NOT SPECIFIED'.
>
> 8. DO NOT PROVIDE EXPLANATIONS. ONLY PROVIDE THE FINAL OUTPUTRESPONSE WITH THE JSON FORMAT SPECIFIED ABOVE.

9. You must output your response in the following JSON format:
{
  "rollout_date": {
    "date": "YYYY/MM/DD"
  }
}
THESE FINAL THREE GUIDELINES ARE THE MOST IMPORTANT ##
10. MAKE SURE that the given date is NOT from 'Targeted Release', 'Preview', 'Limited Release' or 'Beta' UNLESS they are the only dates mentioned.
11. If the summary and/or reasoning talks about different release cadences or types you should IGNORE the rollout date specified in "Targeted Release" or IGNORE "Preview" or IGNORE "Limited Release" or IGNORE "Beta" and pick the EARLIEST date mentioned for the rollout date from the OTHER available categories, UNLESS it is the only date mentioned.
For example, if the summary says something like:
"The rollout will begin in early July 2024 (Targeted Release) and is expected to complete by mid-July 2024, with General Availability starting mid-July 2024 and completing by late July 2024.", then you would pick 2024 Jul. 15 as your rollout date, since this is the earlisest date, IGNORING the Targeted Release cadence. You want to pick the release cadence of General Availability.
Another Example, if the summary and/or reasoning says something like:
"Preview: We will begin rolling out early October 2023. General Availability: We will begin rolling out early November 2023 and expect to complete by mid-November 2023. Other: we will begin rolling out early January 2024 and expect to complete by late January 2024." your response should be:
{
  "rollout_date": {
    "date": "2023 Nov. 1"
  }
}
This is a REALLY IMPORTANT POINT, so here is another example. If the summary or reasoning say something like:
"The rollout will begin in early June 2024 for Targeted Release, completing by late July 2024, and in mid-July 2024 for General Availability, completing by mid-August 2024."
You should pick 2024 Jul. 15, since we IGNORE the Targeted Release. Notice how the message says "and in mid-July 2024 for General Availability".
12. Otherwise, if none of these rules apply, then defer to using the reasoning and your best judgement to determine if you should adjust the date. The original reasoning and summary should provide a logical framework for you to decide if all else fails. As a fallback, you can simply use the original date provided.
To summarize:
  Use the data provided to determine if the original rollout date is correct.
  Most of the time dates will be relative. early-<month>means use the 1st day of the month, mid-<month>means use the 15th and late-<month>means use the last day of the month.
  IGNORE the rollout dates specified as "Targeted Release", "Preview" or "Preview". Prefer dates that are "General Availability", "Worldwide", etc.
  Finally, if you determine that the original date provided is wrong, change the date to the correct date.
""""

Figure 3:
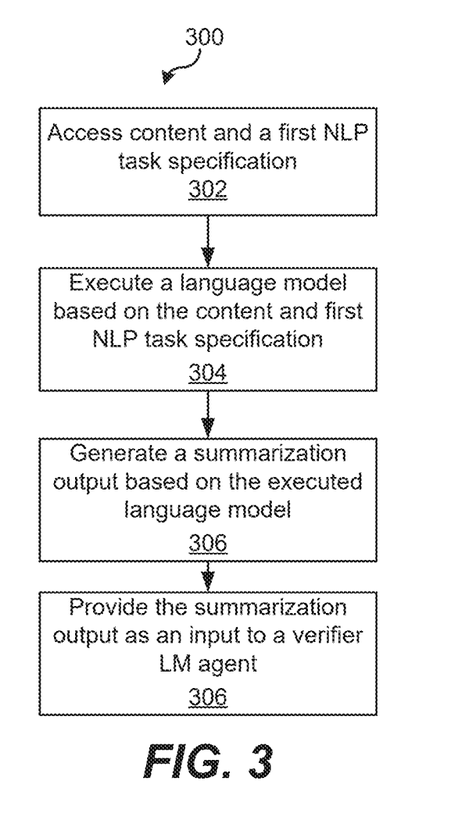
FIG. 3 illustrates an example of a method of performing a summarization task by the summarizer agent, according to an implementation.

FIG. 3 illustrates an example of a method 300 of performing a summarization task by the summarizer agent (such as summarizer agent 222A), according to an implementation.

At 302, the method 300 may include accessing content (such as content 101, 201) and a first NLP task specification (such an NLP task specification 103A, 203A). In some examples, the first NLP task specification may include an instruction to perform a first task, such as to generate a summary of the content. In some examples, the first NLP task specification may include an instruction to identify target information within the content and to include the target information in the summary.

At 304, the method 300 may include executing one or more language models (such as one or more language models 130A-N) based on the content and the first NLP task specification. For example, the method 300 may include executing an LLM with one or more prompts that is based on the first NLP task specification.

At 306, the method 300 may include generating a summarization output (such as summarization output 225A), which includes the summary, based on the content and the first NLP task specification. In examples that use an LLM, a prompt based on the first NLP task specification may be generated and used as an input to the LLM. In these examples, the summarization output may be an output of the LLM that is prompted, using the generated prompt, to generate the summary with target information.

At 308, the method 300 may include providing the summarization output, as input, to a verifier agent (such as the verifier agent 222C).

Figure 4:
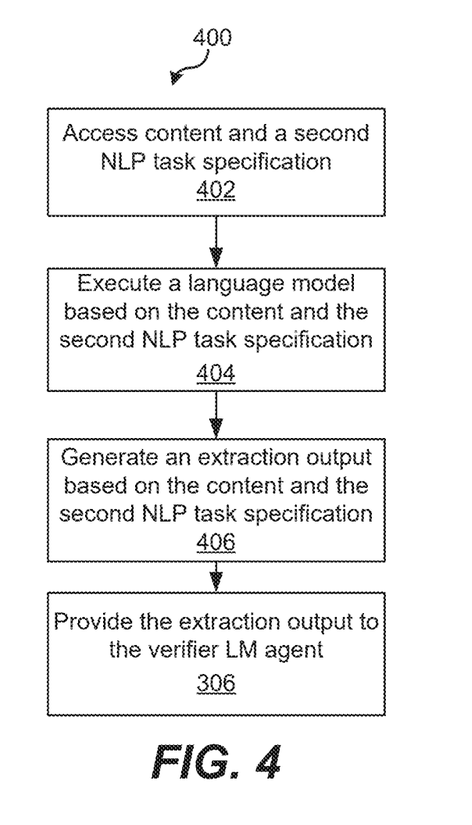
FIG. 4 illustrates an example of a method of performing an extraction task by the assessor agent, according to an implementation.

FIG. 4 illustrates an example of a method 400 of performing an extraction task by the assessor agent (such as the assessor agent 222B), according to an implementation.

At 402, the method 400 may include accessing content (such as content 101, 201) and a second NLP task specification (such an NLP task specification 103B, 203B). In some examples, the second NLP task specification may include an instruction to perform a second task, such as to extract target information from the content. In some examples, the second NLP task specification may include an instruction to extract target information from the content and to include a reasoning that explains why the target information was identified for extraction. In some examples, the second NLP task specification may include one or more guidelines for extracting the target information.

At 404, the method 400 may include executing one or more language models (such as one or more language models 130A-N) based on the content and the second NLP task specification. For example, the method 400 may include executing an LLM with one or more prompts that is based on the second NLP task specification. The one or more language models 130A-N may be the same or different than the one or more language models 130 used by the method 300 illustrated in FIG. 3.

At 406, the method 300 may include generating an extraction output (such as extraction output 225B), which includes the extracted target information, based on the content and the second
NLP task specification. In examples that use an LLM, a prompt based on the second NLP task specification may be generated and used as an input to the LLM. In these examples, the extraction output may be an output of the LLM that is prompted, using the generated prompt, to output the extracted target information and reasoning that the language model used to identify the target information for extraction.

At 408, the method 400 may include providing the extraction output, as input, to a verifier agent.

Figure 5:
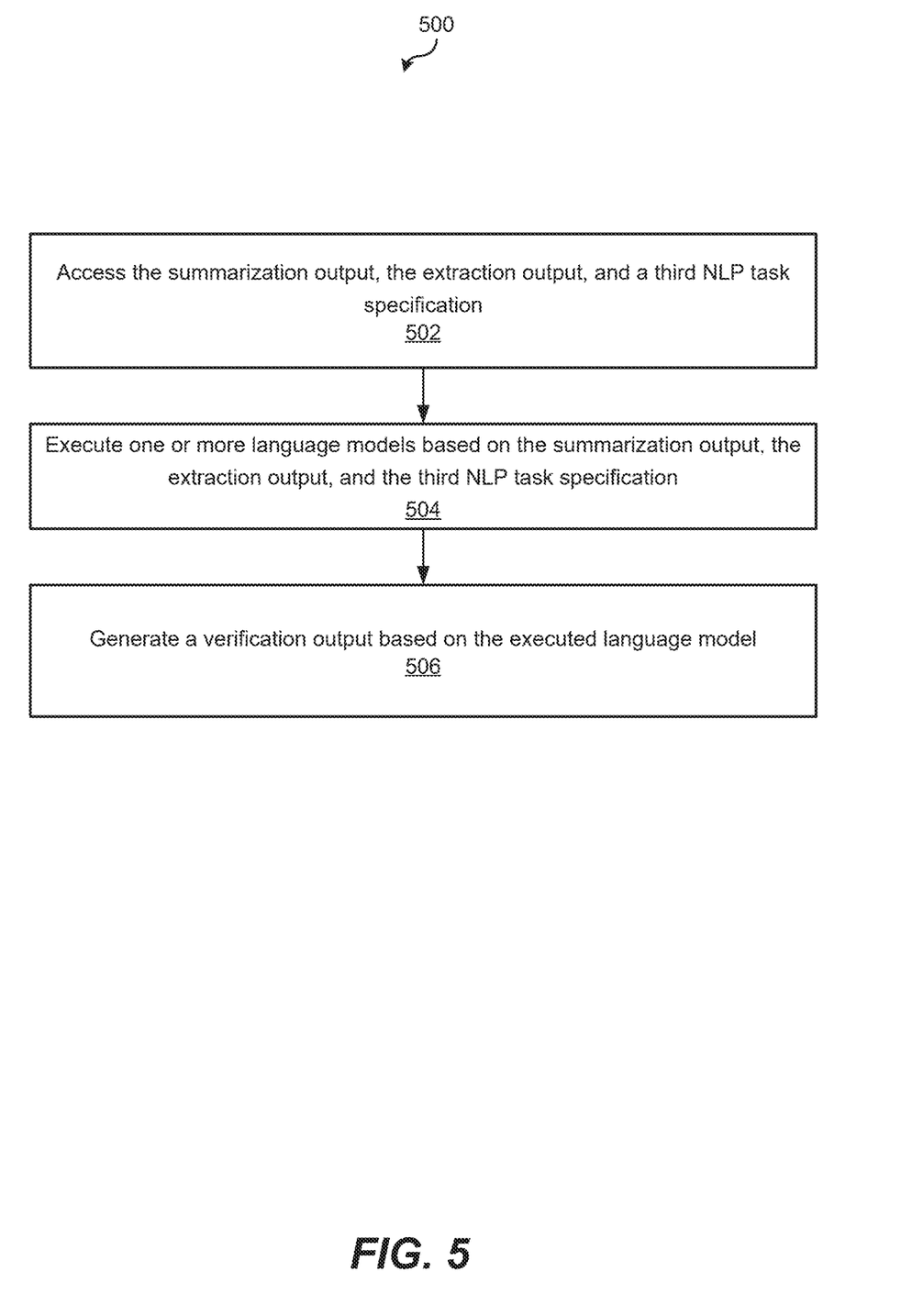
FIG. 5 illustrates an example of a method of performing a verification task by the verifier agent, according to an implementation.

FIG. 5 illustrates an example of a method 500 of performing a verification task by the verifier agent (such as the verifier agent 222C), according to an implementation.

At 502, the method 500 may include accessing the summarization output (such as summarization output 225A), the extraction output (such as extraction output 225B), and a third NLP task specification (such an NLP task specification 103C, 203C). In some examples, the third NLP task specification may include an instruction to perform a third task, such as to verify the target information included in the summarization output and/or the extraction output is correct. In some examples, the third NLP task specification may include one or more guidelines that include rules for how to verify the whether the target information included in the summarization output and/or the extraction output is correct. In some examples, the third NLP task specification may include one or more guidelines that include rules for identifying the target information if the target information in the summarization output and/or the extraction output is deemed incorrect.

At 504, the method 500 may include executing one or more language models (such as one or more language models 130A-N) based on the summarization output, the extraction output (including the extracted target information and reasoning), and the third NLP task specification.

For example, the method 500 may include executing an LLM with one or more prompts that is based on the third NLP task specification. The one or more language models 130A-N may be the same or different than the one or more language models 130 used by the method 300 and/or the method 400 respectively illustrated in FIGS. 3 and 4.

At 506, the method 500 may include generating a verification output (such as the verification output 225C) based on the executed language model. In examples that use an LLM, a prompt based on the summarization output, the extraction output, and the third NLP task specification may be generated and used as an input to the LLM. In these examples, the verification output may be an output of the LLM that is prompted, using the generated prompt, to verify the target information and generate the verification output.

Figure 6:
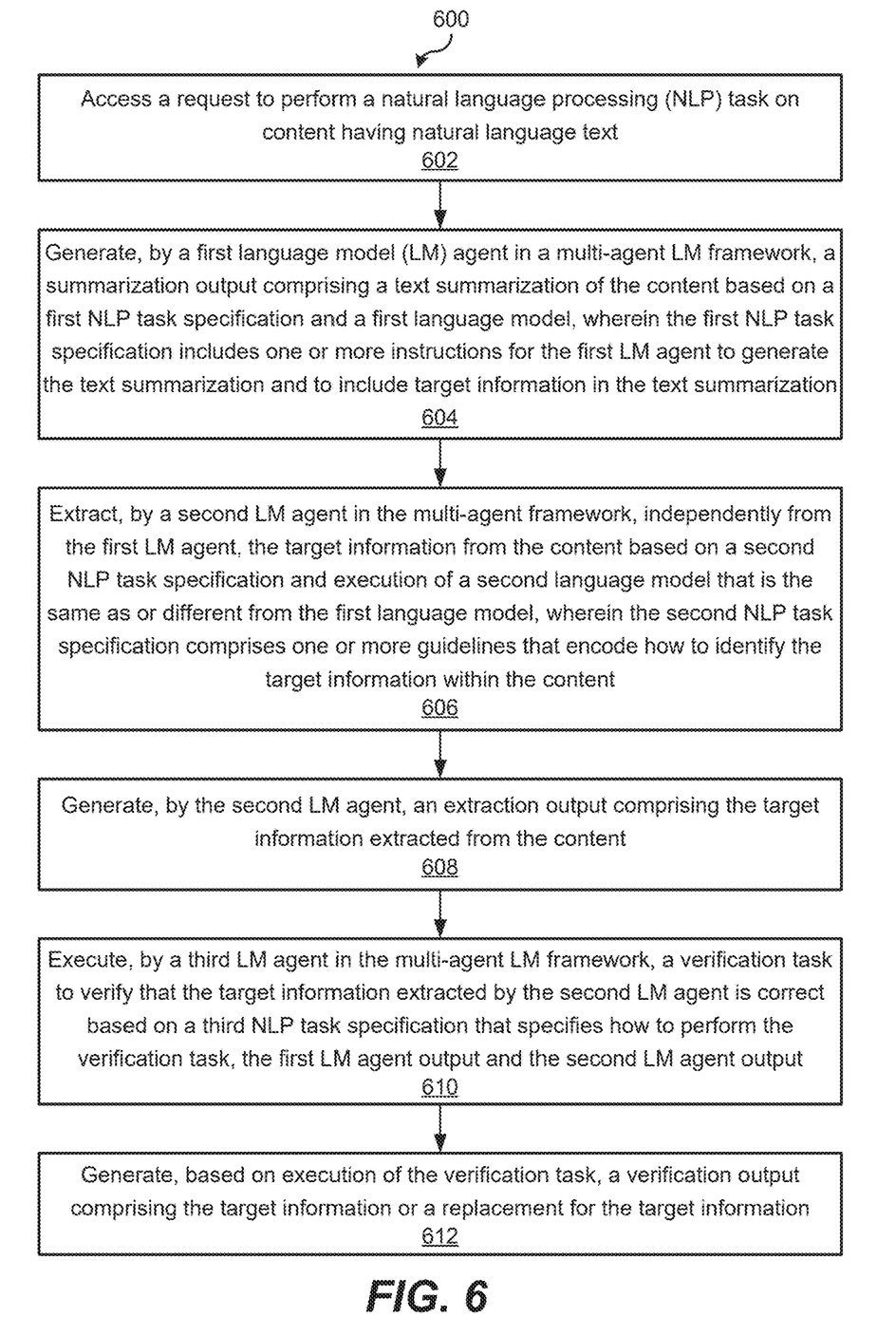
FIG. 6 illustrates an example of a method of performing an NLP task based on a multi-agent framework, according to an implementation.

FIG. 6 illustrates an example of a method 600 of performing an NLP task based on a multi-agent framework, according to an implementation.

At 602, the method 600 may include accessing a request to perform a natural language processing (NLP) task on content having natural language text.

At 604, the method 600 may include generating, by a first language model (LM) agent (such as 122A, 222A) in a multi-agent LM framework (such as the multi-agent framework 120), a summarization output (such as summarization output 225A) comprising a text summarization of the content based on a first NLP task specification (such as NLP task specification 203A) and a first language model (such as one or more language models 130), wherein the first NLP task specification includes one or more instructions for the first LM agent to generate the text summarization and to include target information (such as target information 104) in the text summarization.

At 606, the method 600 may include extracting, by a second LM agent (such 122B, 222B) in the multi-agent framework, independently from the first LM agent, the target information from the content based on a second NLP task specification (such as NLP task specification 203B) and execution of a second language model (such as one or more language models 130) that is the same as or different from the first language model, wherein the second NLP task specification comprises one or more guidelines that encode how to identify the target information within the content.

At 608, the method 600 may include generating, by the second LM agent, an extraction output (such as extraction output 225B) comprising the target information extracted from the content.

At 610, the method 600 may include execute, by a third LM agent (such as 222C) in the multi-agent LM framework, a verification task to verify that the target information extracted by the second LM agent is correct based on a third NLP task specification (such as NLP task specification 203C) that specifies how to perform the verification task, the first LM agent output and the second LM agent output.

At 612, the method 600 may include generating, based on execution of the verification task, a verification output comprising the target information or a replacement for the target information.

The multi-agent framework 120 (and the specific example of this framework illustrated as the multi-agent framework 220 in FIG. 2) may dynamically adapt to the context of the content 101, 201. Unlike traditional NLP techniques such as Named Entity Recognition (NER), Regular Expressions (REGEX), or rule-based systems, which often rely on rigid structures and predefined patterns, the multi-agent framework 120 and/or 220 leverages the deep contextual understanding provided by language models 130. By dividing the task among specialized agents, each focusing on a specific aspect of the document, the system ensures a more nuanced and accurate extraction process. The use of language models 130 (such as LLMs) allows the multi-agent framework 120 and/or 220 to understand and retain the broader context of the document, making it possible to extract data points that traditional methods might miss or misinterpret.

The multi-agent framework 120 and/or 220 allows for a layered approach, where each agent in the framework contributes to refining and validating the extracted data, thereby reducing errors and improving accuracy. This contrasts with traditional single-model approaches, which lack the depth of context understanding and error-checking provided by this invention.

Unlike traditional NLP techniques such as Named Entity Recognition (NER), Regular Expressions (REGEX), or rule-based systems that rely on predefined patterns or rigid structures, this multi-agent framework 120 and/or 220 leverages the deep contextual understanding inherent in language models. Both the summarizer agent and the assessor agent have access to the full document, allowing them to consider the entire context when extracting data. This ensures that the data points extracted are not only accurate but also relevant within the broader context of the document.

The verifier agent introduces a layer of validation by taking the outputs of the summarizer agent and assessor agent, along with their reasoning, and performing a final check to ensure accuracy. This agent does not rely on the full context of the document but instead uses the summaries and reasoning provided by the other agents to make its final determination. This iterative validation process significantly reduces the likelihood of errors, such as hallucinations, and enhances the overall reliability of the extraction.

The multi-agent framework 120 and/or 220 is not limited to extracting specific types of data, such as dates or timelines, but can be adapted to any type of data by simply adjusting the prompts provided to the agents. This flexibility allows the invention to be applied across a wide range of unstructured data extraction tasks, making it a powerful and versatile tool that can be tailored to meet diverse needs.

The combination of multi-agent collaboration, deep contextual awareness, and iterative validation leads to a significant improvement in accuracy compared to traditional methods. Overall, the multi-agent framework 120 and/or 220 represents an improvement in the field of NLP by providing a robust, flexible, and accurate solution for extracting data from unstructured text. Its novel use of multi-agent language models (such as LLMs), contextual processing, and iterative validation sets it apart from known solutions and addresses the deficiencies of traditional approaches.

The datastores (such as 140) may be a database, which may include, or interface to, for example, an Oracle™ relational database sold commercially by Oracle Corporation. Other databases, such as Informix™, DB2 or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The datastores may include cloud-based storage solutions. The database may store a plurality of types of data and/or files and associated data or file descriptions, administrative information, or any other data. The various datastores may store predefined and/or customized data described herein.

Each of system components illustrated in the figures may include a processor programmed to execute or implement the functionality described herein by software; hardware; firmware; some combination of software, hardware, and/or firmware; and/or other mechanisms for configuring processing capabilities on processor. The processor may include one or more of a digital processor, an analog processor, a digital circuit designed to process information, an analog circuit designed to process information, a state machine, and/or other mechanisms for electronically processing information. In some embodiments, the processor may comprise a plurality of processing units. These processing units may be physically located within the same device, or the processor may represent processing functionality of a plurality of devices operating in coordination.

The description of the functionality provided by the different components is for illustrative purposes, and is not intended to be limiting, as any of the components or features may provide more or less functionality than is described, which is not to imply that other descriptions are limiting. For example, one or more of the components or features may be eliminated, and some or all of its functionality may be provided by others of the components or features, again which is not to imply that other descriptions are limiting. As another example, a given processor may include one or more additional components that may perform some or all of the functionality attributed below to one of the components or features.

Each of the system components illustrated in the figures may also include memory in the form of electronic storage. The electronic storage may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionalities described herein.

Each of the system components may be connected to one another via a communication network (not illustrated), such as the Internet or the Internet in combination with various other networks, like local area networks, cellular networks, or personal area networks, internal organizational networks, and/or other networks.

The systems and processes are not limited to the specific implementations described herein. In addition, components of each system and each process can be practiced independent and separate from other components and processes described herein. Each component and process also can be used in combination with other assembly packages and processes. The flow charts and descriptions thereof herein should not be understood to prescribe a fixed order of performing the method blocks described therein. Rather the method blocks may be performed in any order that is practicable including simultaneous performance of at least some method blocks. Furthermore, each of the methods may be performed by one or more of the system features illustrated in FIG. 1 or FIG. 2.

This written description uses examples to disclose the implementations, including the best mode, and to enable any person skilled in the art to practice the implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
   a processor programmed to:
   access a request to perform a natural language processing (NLP) task on content having natural language text;
   generate, by a first language model (LM) agent in a multi-agent LM framework, a summarization output comprising a text summarization of the content based on a first NLP task specification and a first language model, wherein the first NLP task specification includes one or more instructions for the first LM agent to generate the text summarization and to include target information in the text summarization;
   extract, by a second LM agent in the multi-agent framework, independently from the first LM agent, the target information from the content based on a second NLP task specification and execution of a second language model that is the same as or different from the first language model, wherein the second NLP task specification comprises one or more guidelines that encode how to identify the target information within the content;

generate, by the second LM agent, an extraction output comprising the target information extracted from the content;

execute, by a third LM agent in the multi-agent LM framework, a verification task to verify that the target information extracted by the second LM agent is correct based on a third NLP task specification that specifies how to perform the verification task, the first LM agent output and the second LM agent output; and generate, based on execution of the verification task, a verification output comprising the target information or a replacement for the target information.

2. The system of claim 1, wherein the second NLP task specification further comprises an instruction to include a reasoning that explains why the target information was identified for extraction from the content, and wherein the second LM agent is configured to include the reasoning in the extraction output.

3. The system of claim 2, wherein the third LM agent uses the reasoning as part of the verification task.

4. The system of claim 1, wherein the first NLP task specification comprises a context that describes how to access the content and one or more guidelines that are to be adhered to during generation of the summarization output, and wherein the first LM agent is configured to use the context to generate the summarization output and the one or more guidelines to constrain the summarization output.

5. The system of claim 1, wherein the one or more guidelines that encode how to identify the target information within the content comprises one or more conditional statements that are evaluated against the content, and wherein the one or more language models executed by the second LM agent evaluates the one or more conditional statements to identify the target information within the content.

6. The system of claim 5, wherein the one or more conditional statements, when evaluated, results in identification of the target information from a first portion of the content instead of a second portion of the content.

7. The system of claim 5, wherein the one or more conditional statements, when evaluated, results in ignoring at least a portion of the content.

8. The system of claim 1, wherein to generate the verification output, the third LM agent is configured to execute a third language model that is different from or the same as the first language model.

9. The system of claim 1, wherein the third NLP task specification comprises one or more guidelines that are to be adhered to during generation of the verification output, and wherein the third LM agent is configured to use the one or more guidelines to analyze the summarization output and the extraction output and determine whether the target information from the extraction output is correct.

10. The system of claim 1, wherein the third LM agent is configured to determine, based on the one or more guidelines, that the target information is incorrect, and wherein the third LM agent is configured to identify the target information based on the one or more guidelines.

11. A method, comprising:

accessing a request to perform a natural language processing (NLP) task on content having natural language text;

generating, by a first language model (LM) agent in a multi-agent LM framework, a summarization output comprising a text summarization of the content based on a first NLP task specification and a first language model, wherein the first NLP task specification includes one or more instructions for the first LM agent to generate the text summarization and to include target information in the text summarization;

extracting, by a second LM agent in the multi-agent framework, independently from the first LM agent, the target information from the content based on a second NLP task specification and execution of a second language model that is the same as or different from the first language model, wherein the second NLP task specification comprises one or more guidelines that encode how to identify the target information within the content;

generating, by the second LM agent, an extraction output comprising the target information extracted from the content;

executing, by a third LM agent in the multi-agent LM framework, a verification task to verify that the target information extracted by the second LM agent is correct based on a third NLP task specification that specifies how to perform the verification task, the first LM agent output and the second LM agent output; and generating, based on execution of the verification task, a verification output comprising the target information or a replacement for the target information.

12. The method of claim 11, wherein the second NLP task specification further comprises an instruction to include a reasoning that explains why the target information was identified for extraction from the content, and wherein the second LM agent is configured to include the reasoning in the extraction output.

13. The method of claim 12, wherein the third LM agent uses the reasoning as part of the verification task.

14. The method of claim 11, wherein the first NLP task specification comprises a context that describes how to access the content and one or more guidelines that are to be adhered to during generation of the summarization output, the method further comprising: using, by the first LM agent, the context to generate the summarization output and the one or more guidelines to constrain the summarization output.

15. The method of claim 11, wherein the one or more guidelines that encode how to identify the target information within the content comprises one or more conditional statements that are evaluated against the content, and wherein the one or more language models executed by the second LM agent evaluates the one or more conditional statements to identify the target information within the content.

16. The method of claim 15, wherein the one or more conditional statements, when evaluated, results in identification of the target information from a first portion of the content instead of a second portion of the content.

17. The method of claim 15, wherein the one or more conditional statements, when evaluated, results in ignoring at least a portion of the content.

18. The method of claim 11, wherein generating the verification output, comprises executing, by the third LM agent, a third language model that is different from or the same as the first language model.

19. The method of claim 11, wherein the third NLP task specification comprises one or more guidelines that are to be adhered to during generation of the verification output, the method further comprising using, by the third LM agent, the one or more guidelines to analyze the summarization output and the extraction output and determine whether the target information from the extraction output is correct.

20. A non-transitory computer readable medium storing instructions that, when executed by a processor, programs the processor to:
- access a request to perform a natural language processing (NLP) task on content having natural language text;
- generate, by a first language model (LM) agent in a multi-agent LM framework, a summarization output comprising a text summarization of the content based on a first NLP task specification and execution of a first language model, wherein the first NLP task specification includes one or more instructions for the first LM agent to generate the text summarization and to include target information in the text summarization;
- identify, by a second LM agent in the multi-agent framework, independently from the first LM agent, the target information within the content based on a second NLP task specification and execution of a second language model that is the same as or different from the first language model, wherein the second NLP task specification includes one or more instructions for the second LM agent to identify and extract the target information from the content;
- generate, by the second LM agent, an extraction output comprising the target information identified within the content; and
- execute, by a third LM agent in the multi-agent LM framework, a verification task to validate the target information extracted by the second LM agent based on a third NLP task specification that specifies how to perform the verification task, the first LM agent output and the second LM agent output.

* * * * *